(12) United States Patent
Lutz et al.

(10) Patent No.: US 12,280,390 B2
(45) Date of Patent: Apr. 22, 2025

(54) GLUE APPLICATION DEVICE

(71) Applicant: HOMAG GmbH, Schopfloch (DE)

(72) Inventors: Max Lutz, Fulda (DE); Johannes Schmid, Starzach (DE)

(73) Assignee: HOMAG GmbH, Schopfloch (DE)

( * ) Notice: Subject to any disclaimer, the term of this patent is extended or adjusted under 35 U.S.C. 154(b) by 630 days.

(21) Appl. No.: 17/605,866

(22) PCT Filed: Apr. 23, 2020

(86) PCT No.: PCT/EP2020/061308
§ 371 (c)(1),
(2) Date: Oct. 22, 2021

(87) PCT Pub. No.: WO2020/216828
PCT Pub. Date: Oct. 29, 2020

(65) Prior Publication Data
US 2022/0219192 A1   Jul. 14, 2022

(30) Foreign Application Priority Data

Apr. 24, 2019 (DE) .................... 10 2019 110 567.6

(51) Int. Cl.
| | |
|---|---|
| *B29C 65/00* | (2006.01) |
| *B05C 1/08* | (2006.01) |
| *B27G 11/00* | (2006.01) |
| *B05C 11/10* | (2006.01) |
| *B27G 11/02* | (2006.01) |
| *B29C 65/52* | (2006.01) |

(52) U.S. Cl.
CPC .......... *B05C 1/0813* (2013.01); *B27G 11/005* (2013.01); *B05C 1/0834* (2013.01); *B05C 11/1042* (2013.01); *B27G 11/02* (2013.01); *B29C 65/524* (2013.01); *B29C 65/525* (2013.01); *B29C 66/8362* (2013.01)

(58) Field of Classification Search
CPC . B29C 65/524; B29C 65/525; B29C 66/8362; B05C 1/0813
See application file for complete search history.

(56) References Cited

U.S. PATENT DOCUMENTS

| | | |
|---|---|---|
| 2009/0038760 A1 | 2/2009 | Gambini |
| 2009/0235863 A1 | 9/2009 | Takatsuka |
| 2017/0253768 A1 | 9/2017 | Kappeler |

(Continued)

FOREIGN PATENT DOCUMENTS

| | | |
|---|---|---|
| CN | 107150006 A | 9/2017 |
| CN | 108772245 A | 11/2018 |
| DE | 34 47 592 A1 | 7/1986 |

(Continued)

OTHER PUBLICATIONS

DE 3,447,592 specification translation (Year: 1984).*

(Continued)

*Primary Examiner* — Philip C Tucker
*Assistant Examiner* — Nickolas R Harm
(74) *Attorney, Agent, or Firm* — Oblon, McClelland, Maier & Neustadt, L.L.P.

(57) ABSTRACT

A glue application device is provided for the application of glue to a short side of a plate-shaped workpiece. Such a glue application device can be included in a coating machine.

13 Claims, 7 Drawing Sheets

(56) References Cited

U.S. PATENT DOCUMENTS

2019/0047012 A1    2/2019  Saito et al.

FOREIGN PATENT DOCUMENTS

| EP | 1 243 345 A2 | 9/2002 |
| EP | 2 078 595 A1 | 7/2009 |
| EP | 2 428 340 A1 | 3/2012 |
| WO | WO 2017/154433 A1 | 9/2017 |

OTHER PUBLICATIONS

Combined Chinese Office Action and Search Report issued Jan. 6, 2023 in Chinese Patent Application No. 202080030338.5, 8 pages.
German Search Report issued Mar. 13, 2020 in German Patent Application No. 10 2019 110 567.6 (with English translation of Category of Cited Documents), 6 pages.
International Search Report issued Sep. 14, 2020 in PCT/EP2020/061308 filed Apr. 23, 2020, 2 pages.

* cited by examiner 2          4

GLUE APPLICATION DEVICE

|      |                               |                              |
|------|-------------------------------|------------------------------|
|      | HE File: 240 313/som          |                              |
| (21) | International Application Number: | PCT/E2020/061308         |
| (22) | International Filing Date:    | 23 Apr. 2020                 |
| (30) | Priority Data:                | DE 10 2019 110 567.6 (24 Apr. 2019) |
| (43) | International Publication Date: | 29 Oct. 2020               |
| (71) | Applicant:                    | HOMAG GmbH                   |
| (54) | Title:                        |                              |

The invention relates to a glue application device, in particular a glue application device that is provided for the application of glue to a short side of a plate-shaped workpiece. The invention furthermore relates to a coating machine comprising such a glue application device.

PRIOR ART

Coating machines are known in the prior art, which comprise a glue application roller for processing hot-melt adhesives. A heated, viscous hot-melt adhesive is applied to a short side of a plate-shaped workpiece by means of the application roller, and a coating material is subsequently applied to the short side provided with glue.

Such a device comprises a glue container, which is supplied with liquid hot-melt adhesive, for example via a premelter. Alternatively, it is possible to introduce a granulate into the glue container, which is heated in said glue container by means of a corresponding heating device. Dosing sliders typically regulate the supply of the hot-melt adhesive to the application roller so that a corresponding amount can be applied to the short side of the workpiece.

EP 2 428 340 A1 is furthermore known in the prior art, which relates to dosing arm kinematics. An adjusting mechanism is in particular described in this document, which ensures the supply of glue in the gravitational direction of a glue roller. The advantage provided by this mechanism is, among other things, that a gap size between an edge of an upper part of the device and of the adhesive transfer tool (glue application roller) may be continuously adjusted.

However, the increased variety when manufacturing workpieces with a coating on the short side thereof means that the procedures known in the prior art are reaching their limits. There is also the problem that a glue applied to the application roller, which is to be applied to workpieces that are fed one after the other, may possibly burn or at least become contaminated when the machine is in an idle state if the transfer of glue is not carried out continuously. A corresponding cleaning effort thus arises. Furthermore, the temporary non-transfer of glue from the application roller to a workpiece, in particular during idle operation of the coating machine or in the event that no further workpieces are fed, leads to a change in the physical properties of the glue.

SUBJECT MATTER OF THE INVENTION

An object of the invention is to provide a glue application device that has increased flexibility such that glue application of high quality can be ensured.

The subject matter of claim 1 provides a corresponding glue application device. Further preferred embodiments are specified in the dependent claims. The invention furthermore relates to a coating machine comprising a glue application device.

The glue application device comprises: an application roller which is rotatable about an axis, a first container for accommodating a glue, a first dosing mechanism for dosing the glue to be supplied from the first container to the application roller, wherein the first dosing mechanism is configured to change or limit, by a movement, a section of the application roller that is active for the application of glue, and wherein the first dosing mechanism is configured to stop the supply of glue by a movement thereof.

According to one embodiment, it is provided that the first dosing mechanism comprises a seal which, in sections, is in contact with the application roller. The seal can ensure that a glue applied to the application roller remains in a specific section of the application roller.

It is preferred that the application roller extends from a base element. The active section of the application roller is formed between the base element and the seal. The active section of the application roller is the section that is configured to apply the glue to a workpiece. In this regard, the base element can delimit one side of the active section. The active section can be changed by moving the seal.

A channel for supplying the glue to the application roller may preferably be formed between a side of the first dosing mechanism and a side of a carrier. The side of the first dosing mechanism and one side of a carrier can be inclined at an equal angle to the axis when viewed in cross section. It is thus possible to interrupt the supply of glue to the application roller, if necessary.

It is preferred that the dosing mechanism is movable along a linear guide. In addition, the linear guide may be provided or configured on the container. This makes a compact configuration possible, among other things.

In one embodiment, the container is movable together with the dosing mechanism relative to the application roller. Such movability may preferably be implemented perpendicularly to the axis of the application roller and/or by a pivoting movement in a plane that is perpendicular to the axis. This configuration may be incorporated into the glue application device in a functionally advantageous manner.

According to a further preferred embodiment, the glue application device comprises a second container for accommodating a glue and a second dosing mechanism for dosing the glue to be supplied from the second container to the application roller. The glue application device comprising a second container has the advantage that several, possibly different, glues may be applied to the application roller and accordingly transferred onto workpieces by means of the application roller. It is thus possible to switch between two different glues during a manufacturing process. In this regard, the respective system that is not actively working is closed by means of an adjustment of the dosing mechanism so that glue cannot escape.

In this regard, it is preferred that the second container is movable together with the dosing mechanism relative to the application roller. Movability is ensured in particular perpendicularly to the axis of the application roller and/or by a pivoting movement in a plane that is perpendicular to the axis. This configuration may be incorporated into the glue application device in a functionally advantageous manner, in particular if movability of the first container is implemented accordingly.

The first dosing mechanism may be configured and/or designed to limit, by a movement, a section of the application roller that is active for the application of glue when the second dosing mechanism has stopped the supply of glue. The mechanisms mentioned are thus coordinated in order to ensure safe operation.

The glue application device may be configured to operate the application roller in a continuous or alternating manner.

The invention further relates to a coating machine. The coating machine comprises a glue application device according to one of the preceding configurations and a coating device for applying a coating material to a workpiece.

It is provided in one embodiment that the coating material is a coating material in strip form, which is made, for example, of plastic, real wood, veneer, or the like. A coating material in strip form may be applied to a short side of a workpiece, in particular a plate-shaped workpiece. An example of such a workpiece is a chipboard.

The coating machine may comprise a sensor for detecting a workpiece to be coated. In this regard, a control device of the coating machine may be configured to rotate the application roller upon detection of the workpiece. In this manner, a glue can be applied to a workpiece in a particularly precise manner.

The invention furthermore relates to a method for applying a glue to a workpiece. A glue application device according to one of the configurations above or a coating machine according to the aspects stated above may be used in this method.

DESCRIPTION OF THE PREFERRED EMBODIMENTS

Preferred embodiments of the invention will be explained below by means of the schematic drawings. Although features of the preferred embodiments are to be understood purely as examples, and not in a restrictive manner, features of the embodiments may also be used individually in order to specify the invention. Features of the embodiments may also be combined with one another to form further embodiments of the invention.

Figure 1:
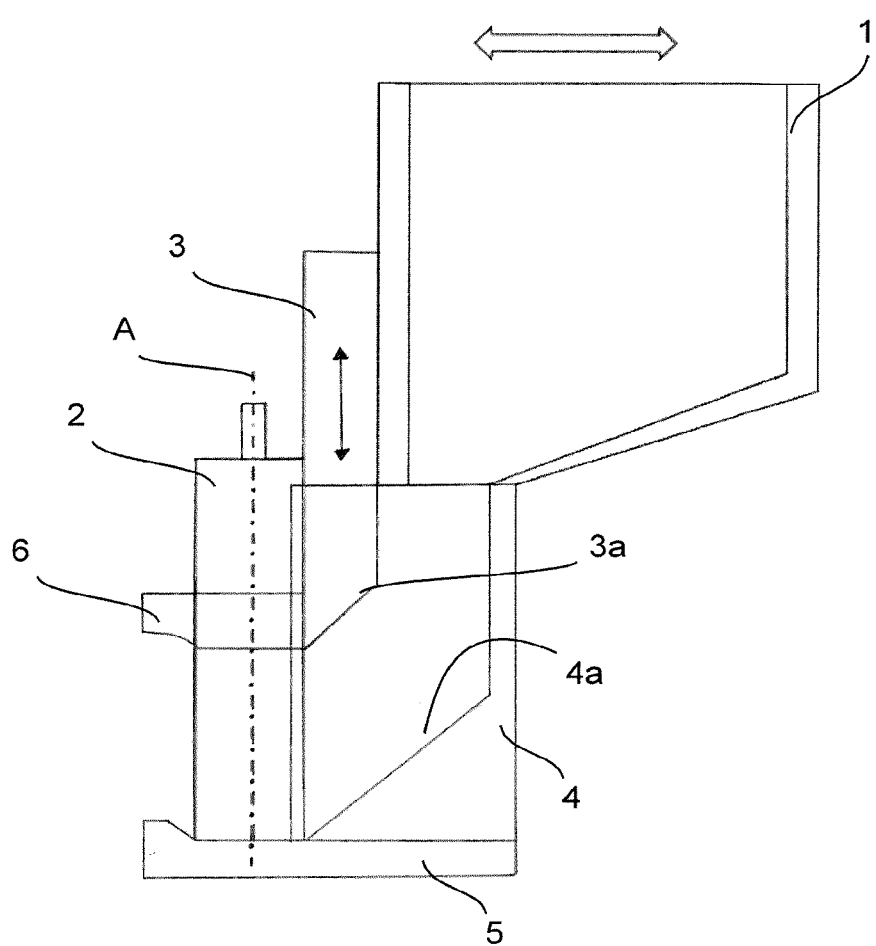
FIG. 1 shows a schematic side view of a first embodiment of the glue application device.
Figure 2:
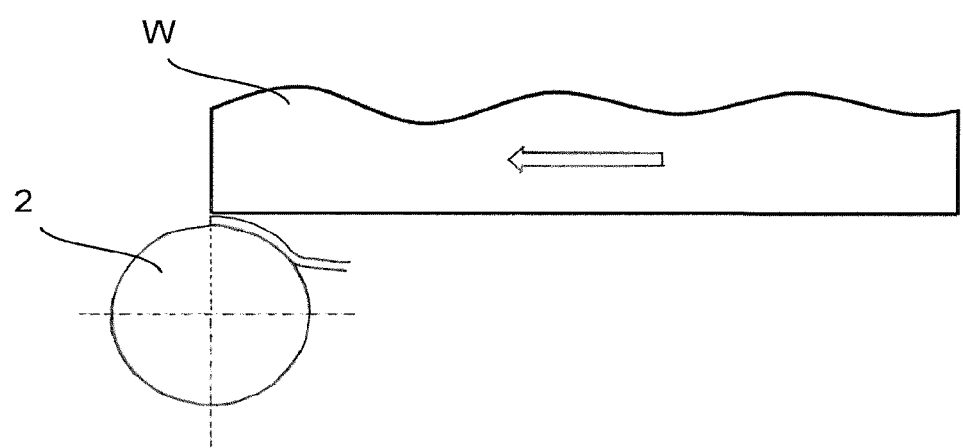
FIG. 2 illustrates the application of glue to a workpiece moving relative to the glue application device.

FIG. 1 shows a schematic side view of a glue application device according to a first embodiment of the invention. The glue application device comprises a container 1 that is either filled with liquid glue or into which a granulate is inserted, which is heated by a heating device (not shown) of the container 1 and thus converted into a liquid state.

The glue application device comprises an application roller 2 that is rotatably mounted about an axis A. The axis A is aligned in a vertical direction. The application roller 2 serves to transfer a glue that is applied thereto to a short side of a plate-shaped workpiece. A control device of the glue application device or of a coating machine comprising the glue application device can drive the application roller 2 continuously or, if required, rotationally.

The glue application device furthermore comprises a dosing mechanism 3 that is provided with a seal 6. The seal 6 provides a seal relative to the rotatable application roller 2. The glue application device is provided with a base element 5 that lies opposite the seal 6 and thus, together with the seal 6, defines the height of glue application. The distance between the seal 6 and the base element 5 varies owing to an adjusting movement of the dosing mechanism 3 and thus of the seal 6, so that the height of glue application can be changed by an adjusting movement of the height adjustment 3. The glue application device can thus be adapted to a workpiece of a different thickness.

The dosing mechanism 3 is in particular configured such that the glue is always applied to the workpiece only over the specifically requested height (height of the short side of the workpiece). In this regard, the dosing mechanism 3 is moved upwards or downwards in a vertical direction along a guide on the container 1. When the height is reduced, a glue is scraped off the application roller 2 by means of the seal 6 that is provided on the dosing mechanism 3. The application roller 2 is also cleaned in this manner.

The container 1 is connected to the base element 5 via a carrier element 4. The supply of glue to the application roller is ensured between the carrier element 4 and the dosing mechanism 3. The dosing mechanism 3 comprises, in particular, an inner side 3a that is inclined to the axis A of the application roller 2, as seen in a cross-sectional side view. An inner side 4a of the carrier element 4 lies opposite the inclined inner side 3a of the dosing mechanism 3. The inner side 4a of the carrier element 4 is also inclined to the axis A of the application roller 2, as seen in a cross-sectional side view.

The inclination angle of the inner side 3a of the dosing mechanism 3 and the inclination angle of the inner side 4a of the carrier element 4, which are each formed relative to the axis A, as seen in a cross-sectional side view, are the same or substantially the same. If the dosing mechanism 3 is moved in the direction of the carrier element 4 in such a manner that the inner side 3a of the dosing mechanism 3 abuts against the inner side 4a of the carrier element 4, the supply of glue to the application roller 2 is interrupted.

The glue application device is modular so that a unit consisting of the container 1, the carrier element 4, the dosing mechanism 3 and the seal 6 can be moved away from the application roller 2 (indicated by a double arrow in FIG. 1). In contrast, the application roller 2 is fixed to the base element 5 and is driven by a motor (not shown), rotating about the axis A.

Figure 3A:
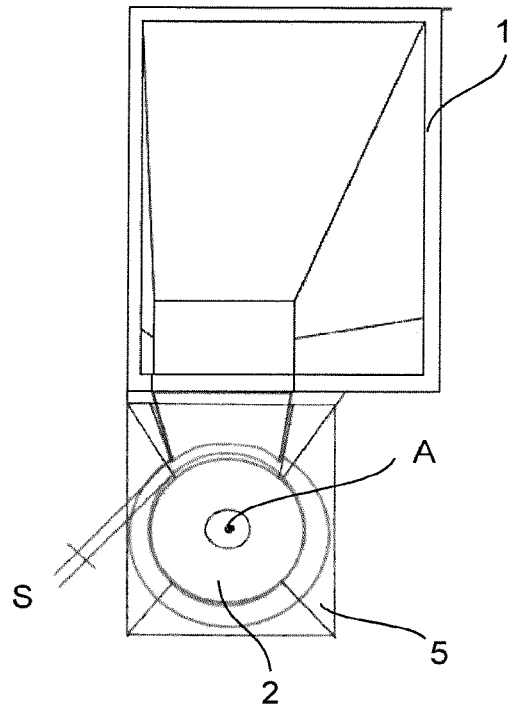
FIG. 3a shows a schematic plan view of the glue application device according to FIG. 1 in an operating position.
Figure 3B:
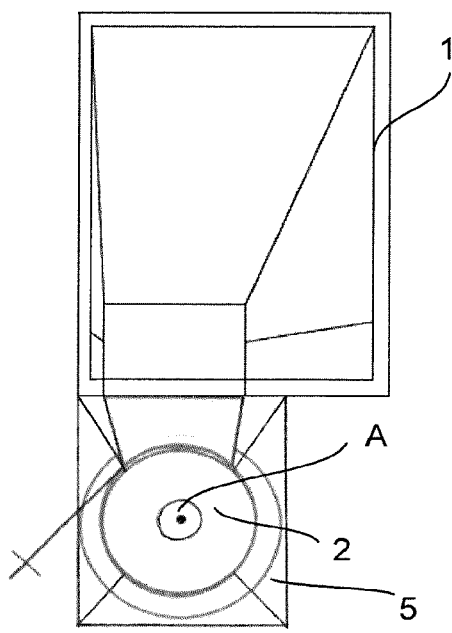
FIG. 3b shows a schematic plan view of the glue application device according to FIG. 1 in a resting position.

With reference to FIGS. 3a and 3b, an adjusting movement of the glue application device from an operating position (FIG. 3a) to a resting position (FIG. 3b) will be explained below.

In an operating position (FIG. 3a), there is a gap S between the dosing mechanism 3 as well as the carrier element 4 on the one hand, and the application roller 2 on the other hand. The seal 6 extends in a horizontal direction beyond the application roller 2.

If the glue application device is put into a resting position, the dosing mechanism as well as the carrier element are moved in a horizontal direction so that the dosing mechanism 3 and the carrier element substantially abut against the application roller 2, and there is thus no gap through which glue may escape.

In the resting position shown in FIG. 3b, there is no gap between the dosing mechanism 3 as well as the carrier element 4 on the one hand, and the application roller 2 on the other hand. The dosing mechanism 3 and the carrier element 4 were positioned in the direction of the application roller 2 for this purpose. The dosing mechanism 3 and the carrier element 4 can be positioned by means of a movement device, in particular a motor or a pneumatic cylinder, or by manual operation.

Figure 4:
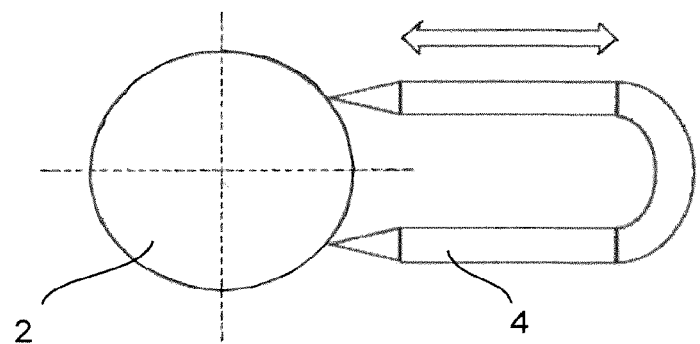
FIG. 4 illustrates a first variant for adjusting the glue application device according to FIG. 1.
Figure 5:
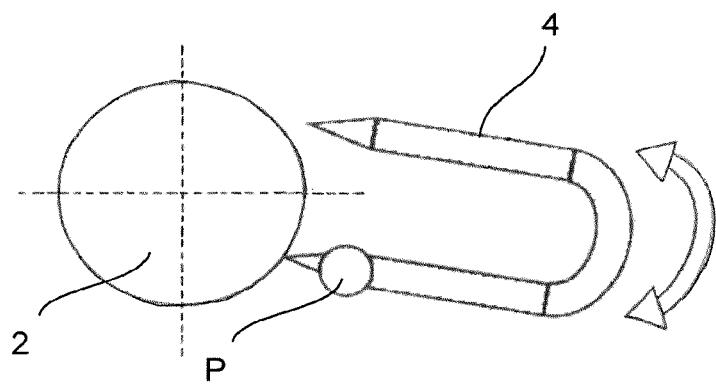
FIG. 5 shows a second variant for adjusting the glue application device illustrated in FIG. 1.

A linear displacement of the dosing mechanism 3 and the carrier element 4 in the horizontal direction is schematically illustrated in FIG. 4. However, according to a further variant (FIG. 5), the dosing mechanism 3 and the carrier element 4 are pivotable about a pivot point P in order to form a gap on one side, relative to the application roller 2, through which the glue may escape.

According to a further variant that is not shown, the linear displacement (FIG. 4) and the pivotability (FIG. 5) of the dosing mechanism 3 and the carrier element 4 may be combined in order to transfer the glue application device from an operating position to a resting position (and vice versa).

Figure 6:
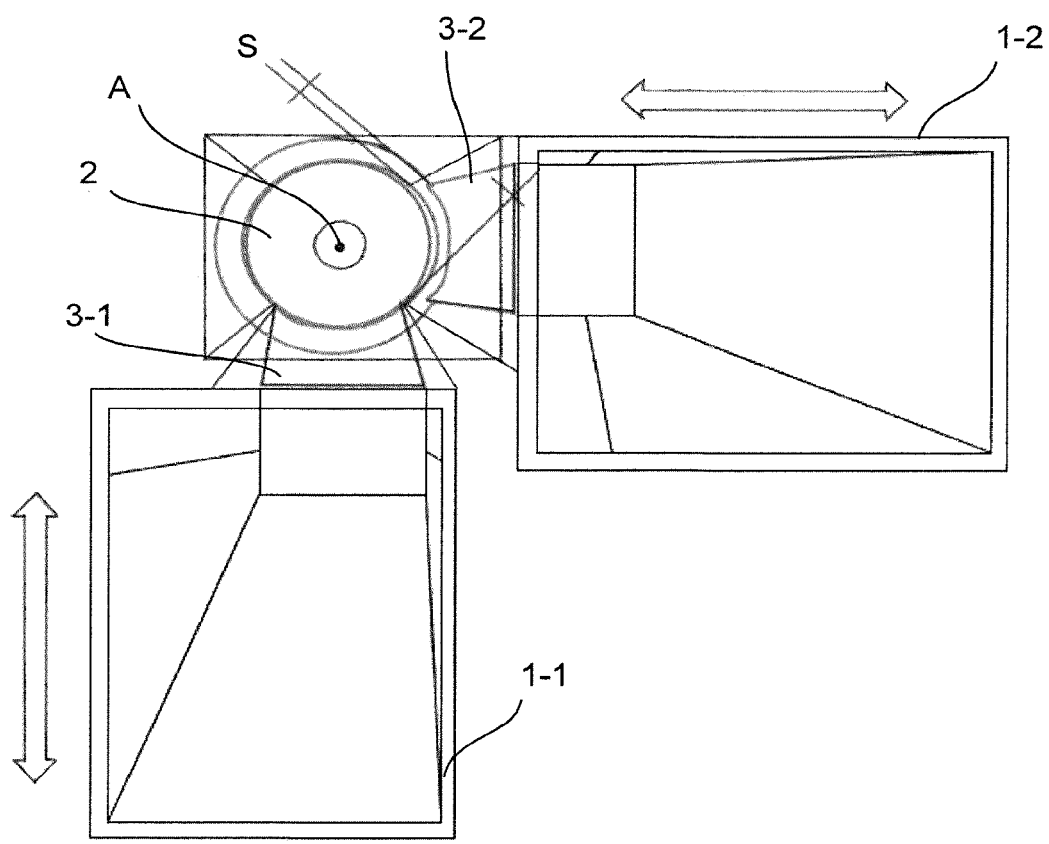
FIG. 6 shows a second embodiment of a glue application device according to the invention.

In FIG. 6, a second embodiment of the invention is shown in a schematic plan view. The second embodiment is characterized in that the glue application device described according to the first embodiment is provided with a further glue container, a further dosing mechanism, a further carrier element, a further base element as well as a further seal. Identical or similar elements of the glue application device are accordingly provided with identical or similar reference numbers. In this regard, reference is additionally made to the explanations relating to the first embodiment.

The glue application device of the second embodiment in particular comprises a first container 1-1 and a second container 1-2 that are either filled with liquid glue or into which a granulate is introduced, which is heated by a heating device (not shown) of the respective container and thus converted into a liquid state. The containers 1-1, 1-2 may have the same or a different configuration.

A first dosing mechanism 3-1 is displaceably arranged on the first container 1-1. In accordance therewith, a second dosing mechanism 3-2 is displaceably provided on the second container 1-2. Reference is made to the explanations relating to the first embodiment as regards further elements, the adjustment of the height of glue application between a respective seal and a base element as well as the transition from a resting to an operating position.

With respect to the axis A of the application roller 2, the containers 1-1, 1-2 are arranged such that they are rotated about an angle of substantially 90°, as seen in the plan view, although another arrangement of the containers 1-1, 1-2 relative to one another is also conceivable.

The glue application device according to the second embodiment has the advantage that several, possibly different, glues may be applied to the application roller 2 and be accordingly transferred onto workpieces by means of the application roller 2. It is thus possible to switch between two different glues during a manufacturing process. In this regard, the respective system that is not actively working is closed by adjusting the dosing mechanism to a lower position so that glue cannot escape.

In the example of FIG. 6, the system comprising the second container 1-2 is in an operating position so that a gap S is formed between the second dosing mechanism 3-2 and the application roller 2. The system comprising the container 1-1 is in a resting position in which the first dosing mechanism 3-1 is positioned such that the inner side of the first dosing mechanism 3-1 abuts against an inner side of the carrier element, and the supply of glue to the application roller 2 is thus interrupted.

The arrows in FIG. 6 indicate that the containers 1-1, 1-2 can be moved linearly in order to correspondingly switch between the respective resting position and the operating position.

Figure 7:
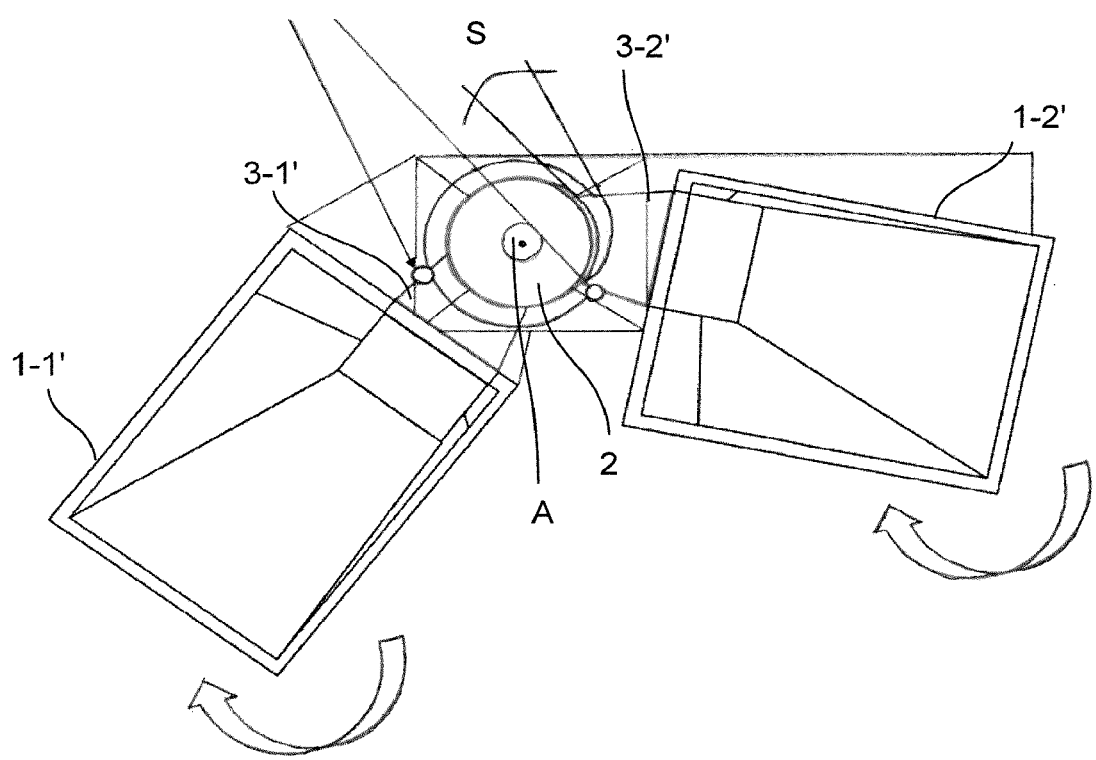
FIG. 7 shows a third embodiment of the glue application device according to the invention.

FIG. 7 shows a third embodiment of the invention which essentially differs from the second embodiment in that, instead of a linear adjusting movement, a pivoting movement of the respective container 1 is provided, whereby the respective system is brought from a resting position into an operating position (and vice versa). Reference is made to that stated with regard to FIG. 5 to explain the pivoting movement.

The glue application device of the third embodiment in particular comprises a first container 1-1' and a second container 1-2' that are either filled with liquid glue or into which a granulate is introduced, which is heated by a heating device (not shown) of the respective container and thus converted into a liquid state. The containers 1-1', 1-2' may have the same or a different configuration.

A first dosing mechanism 3-1' is displaceably arranged on the first container 1-1'. In accordance therewith, a second dosing mechanism 3-2', which can be displaced in height, is provided on the second container 1-2'. Reference is made to the explanations relating to the first and second embodiments as regards further elements and the adjustment of the height of glue application between a respective seal and a base element.

The first container 1-1', the first dosing mechanism 3-1' and the carrier element are pivotable about a first pivoting axis P-1 so as to be transferred from an operating position to a resting position (and vice versa). In accordance therewith, the second container 1-2', the second dosing mechanism 3-2' and the carrier element are pivotable about a second pivoting axis P-2 so as to be transferred from an operating position to a resting position (and vice versa).

In FIG. 7, the system comprising the second container 1-2' is in an operating position so that a gap S is formed between the second dosing mechanism 3-2' and the application roller 2. The system comprising the first container 1-1' is in a resting position in which the first dosing mechanism 3-1' is positioned in such a manner that the inner side of the first dosing mechanism 3-1' abuts against an inner side of the carrier element, and the supply of glue to the application roller 2 is thus interrupted.

The invention claimed is:

1. A glue application device, comprising:
    an application roller which is rotatable about an axis,
    a first container for accommodating a glue to be supplied from the first container to the application roller, and
    a first dosing mechanism for dosing the glue to be supplied from the first container to the application roller,
    wherein the first dosing mechanism is configured to change a section of the application roller that is active for an application of glue and to stop a supply of glue to the application roller by a movement of the first dosing mechanism,
    wherein the first dosing mechanism is movable along a linear guide, and
    wherein the linear guide is provided on the container.

2. The glue application device according to claim 1, wherein the first dosing mechanism comprises a seal which, in sections, is in contact with the application roller.

3. The glue application device according to claim 2, wherein the application roller extends from a base element, with the active section of the application roller being formed between the base element and the seal.

4. The glue application device according to claim 1, wherein a channel for supplying the glue to the application roller is formed between a side of the first dosing mechanism and a side of a carrier, the side of the first dosing mechanism and one side of the carrier being inclined at an equal angle to the axis when viewed in cross section.

5. The glue application device according to claim 1, wherein the container is movable together with the first dosing mechanism relative to the application roller.

6. The glue application device according to claim 5, wherein the container is movable perpendicular to the axis of the application roller and/or by a pivoting movement in a plane that is perpendicular to the axis.

7. The glue application device according to claim 1, further comprising a second container for accommodating a glue and a second dosing mechanism for dosing the glue to be supplied from the second container to the application roller.

8. The glue application device according to claim 7, wherein the second container is movable together with the second dosing mechanism relative to the application roller.

9. The glue application device according to claim 8, wherein the second container is movable perpendicular to the axis of the application roller and/or by a pivoting movement in a plane that is perpendicular to the axis.

10. The glue application device according to claim 7, wherein the first dosing mechanism is configured to limit, by a movement, a section of the application roller that is active for the application of glue when the second dosing mechanism has stopped the supply of glue.

11. The glue application device according to claim 1, wherein the glue application device is configured to operate the application roller in a continuous or alternating manner.

12. A coating machine, comprising:
   the glue application device according to claim 1; and
   a coating device for applying a coating material in strip form to a side of a workpiece.

13. The coating machine according to claim 12, further comprising a sensor for detecting a workpiece to be coated, wherein a control device of the coating machine is configured to rotate the application roller upon detection of the workpiece.

* * * * *